May 8, 1962 W. W. CUSHMAN 3,033,594
FLUID PIPE JOINT OR COUPLING
Filed Oct. 19, 1959 2 Sheets-Sheet 1
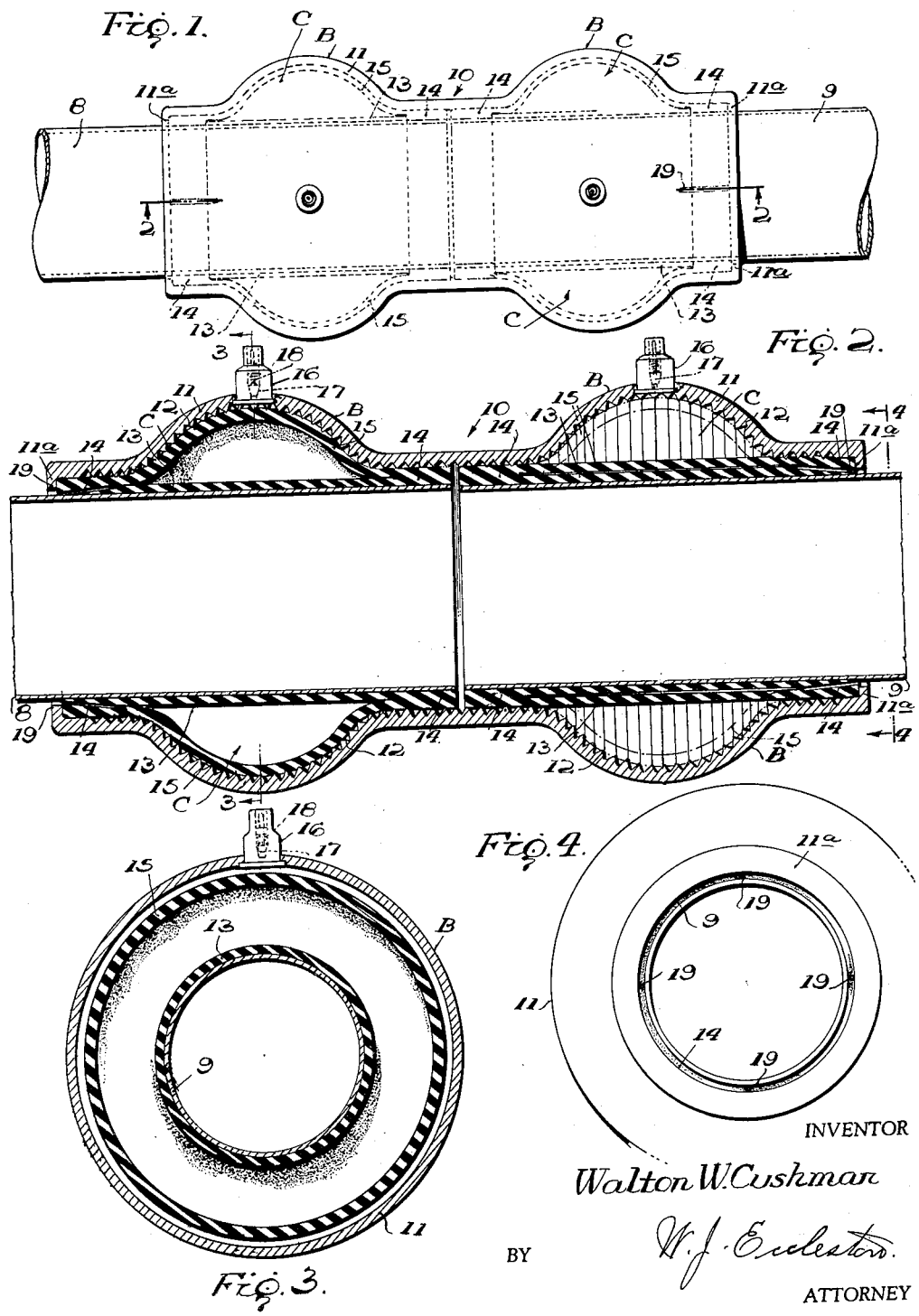
INVENTOR
Walton W. Cushman
BY W. J. Eccleston
ATTORNEY May 8, 1962 W. W. CUSHMAN 3,033,594
FLUID PIPE JOINT OR COUPLING
Filed Oct. 19, 1959 2 Sheets-Sheet 2
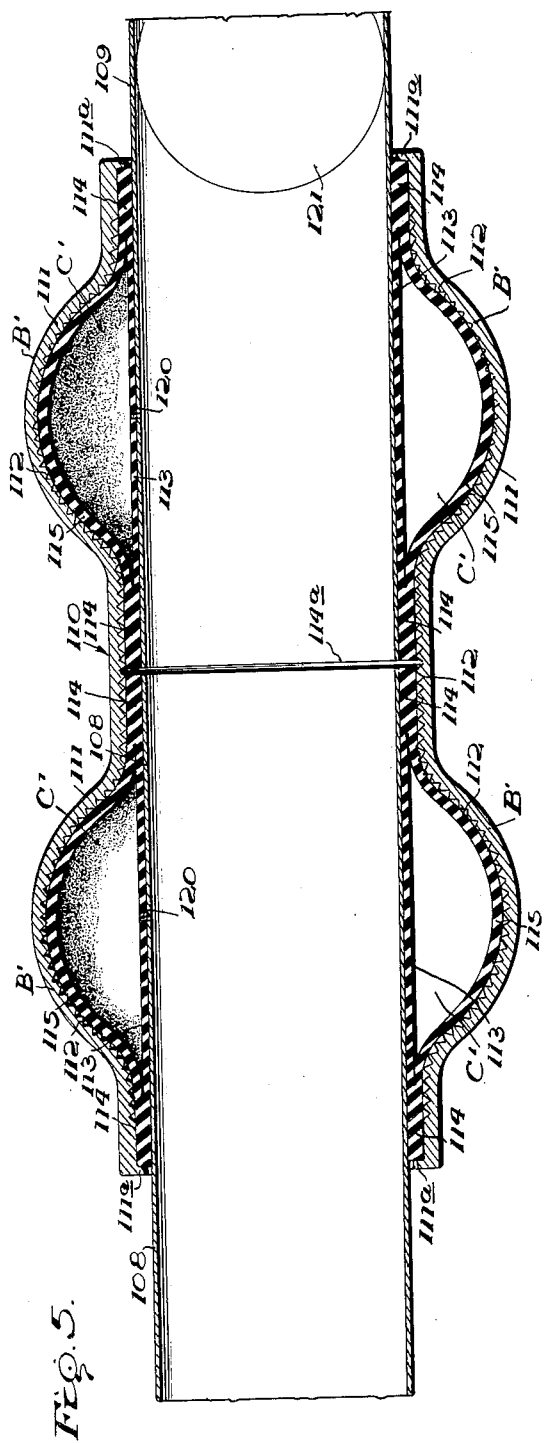
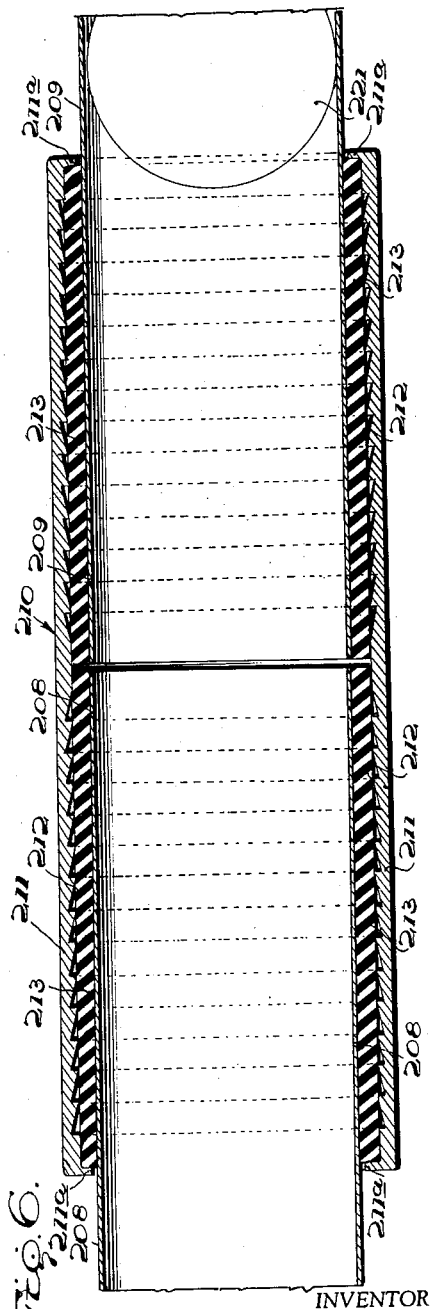
INVENTOR
Walton W Cushman
BY
ATTORNEY United States Patent Office 3,033,594
Patented May 8, 1962

3,033,594
FLUID PIPE JOINT OR COUPLING
Walton W. Cushman, Webb City, Mo.
(6428 Lumar Drive SE., Washington 22, D.C.)
Filed Oct. 19, 1959, Ser. No. 847,435
2 Claims. (Cl. 285—97)
(Granted under Title 35, U.S. Code (1952), sec. 266)

The invention described herein, if patented, may be manufactured and used by or for the Government for governmental purposes, without the payment to me of any royalty thereon.

The present invention relates to a fluid pipe joint or coupling. It has to do particularly, although not exclusively, with a joint or coupling adapted for joining together lengths or sections of flexible pipe or tubing formed from rubber and fabric, or from some suitable elastomer, to produce a POL supply line, one use for such coupled pipe or tubing being, for example, the distribution of petroleum products under combat conditions. It will, of course, be appreciated that ease and facility of assembling the lengths of house or conduit under such conditions is of the utmost importance. Accordingly, a quick-connecting and quick-detachable leakproof coupling means lends itself admirably to the producing of a new and novel POL supply line for the supplying of fuel, etc., to advance operational locations which are remote from the source of supply.

It is, therefore, an important object of the present invention to provide a new, improved, and simplified coupling means for interconnecting lengths or sections of flexible pipe or tubing, capable of conveying petroleum products, or the like, from a source of supply to an advanced base of activity remote from said source.

Another object is to provide a quick-connectable and quick-detachable coupling, as aforesaid, for releasably locking together two adjacent flexible pipe or tube sections of varying lengths by the use of air pressure, by creating a vacuum, or by the pressure of fluid flowing within the coupled-together pipe sections themselves.

A further object of the invention is to provide improved means for coupling flexible fluid-conveying pipe or tubing, in which units or elements of the coupling means may be permanently mounted on the end portions of the lengths or sections of the flexible pipe; another object being to provide improved coupling means which permit the coupled or uncoupled pipe or tubing to be flattened and wound upon and transported by a reel, or the like.

The foregoing and other objects and advantages of the present invention will be apparent from the following description and appended claims when considered in conjunction with the accompanying drawings forming a part of this specification, wherein like reference characters designate corresponding parts in the several views.

In said drawings:

FIGURE 1 is an elevational view of one embodiment of pipe joint or coupling of the present invention, showing the end portions of a pair of coupled flexible pipe sections;

FIGURE 2 is a longitudinal sectional view taken substantially along the line 2—2 of FIGURE 1, looking in the direction of the arrows;

FIGURE 3 is a cross-sectional view of the structure of the preceding views, taken substantially along the line 3—3 of FIGURE 2, looking in the direction of the arrows;

FIGURE 4 is an end elevational view, partly in section, taken on the line 4—4 of FIGURE 2, looking toward the left in the direction of the arrows and showing a preferred spacing and location of the atmospheric intake passages formed in a coupling member;

FIGURE 5 is a longitudinal sectional view through a coupled pipe joint of a modified form of the invention, showing a so-called "pig" in the tubing at the right of the figure; and FIGURE 6 is a longitudinal sectional view of a further modified form of fluid pressure-locked pipe joint or coupling embodying the present invention.

Before explaining in detail the present invention, it is to be understood that the invention is not limited to the details of construction and arrangement of parts illustrated in the accompanying drawings, since the invention is capable of other embodiments and of being practiced or carried out in various ways. It is to be understood also that the phraseology or terminology employed herein is for the purpose of description and not of limitation, and it is not intended to limit the invention claimed herein beyond the requirements of the prior art.

Referring now to FIGS. 1 through 4 of the drawings, there is shown in these views a fluid joint or coupling for connecting together the adjacent ends of lengths or sections of flexible pipe or tubing, two such ends being shown at 8 and 9, respectively, in FIGS. 1 and 2. The coupling assembly is of the quick-detachable type and includes a female member in the nature of a one-piece rigid outer shell or casing 11, preferably formed from metal, having a pair of bulges B, and whose outer ends are provided with circumferential flanges 11a. The inner surface of the cuff or collar 11 is provided with serrations or teeth 12.

The coupling assembly 10 includes a pair of flexible and deformable inner male cuff-like members or portions 13, each having ends 14, one of which ends of each pair abuts the flange 11a on the outer shell 11, as shown. The inner flexible coupling member 13 is split circumferentially to provide an outer layer or laminae 15 which can be expanded or projected into contact with the serrations 12. Each bulged portion B of the outer shell 11 provides space for an expansion chamber C and carries a valve assembly 16 which consists of a tapped body portion, a downwardly tapered valve 17 which is spring-urged toward its seat by a compression spring 18.

As clearly seen in FIG. 4 the enlarged flexible coupling portion 14 at the right side of FIGS. 1 and 2 is provided with a series of four passages or inlet ports 19 which connect the expansion chamber C with the atmosphere. A similar series of ports 19 is provided in the flexible left-hand end portion 14 of the coupling assembly to connect the chamber C at that side with the atmosphere. Whereas, four such ports 19 have been shown at each coupling end, this number may, of course, be varied, it merely being important to provide some means of intercommunication between the formed expansion chambers C and the outside atmosphere.

It will be noted that while each end of the flexible tubing 8 and 9 has the male member 13 of the coupling assembly bonded thereto to form a permanent part thereof, the rigid female member 11 is a separate part of the coupling assembly, such member serving to coact with both end portions of the flexible tubing and with the pair of male portions 13, 14, 13, 14, of the coupling assembly which are bonded to those end portions.

To attach the ends 8 and 9 together, it is merely necessary to first squeeze and thus collapse those ends and slip the rigid outer sleeve 11 over one of the collapsed ends and then to insert the opposite collapsed end until the end portions 14 of both of the flexible tubes are in contact with the end flanges 11a. At this point, suction is applied to the tapped valve assemblies to unseat the valves. This will cause atmospheric air to enter through passages 19 and the vacuum created within the coupling bulges B will create or form the expansion chambers C, with the outer layer or laminae 15 being held in intimate contact with the serrated inner faces or surfaces of the rigid coupling member 11. The parts are clearly shown in coupled condition in FIG. 2. By virtue of the flanges 11a and the serrations 12, it is impossible to disconnect the coupling until after the vacuum within the chambers C has been broken. This can, of course, be effected by unseating valves 17.

Referring now particularly to FIG. 5, a modified form of the quick-detachable fluid pipe joint or coupling is shown. In this form, there is shown the end portion of a flexible tube or pipe 108 at the left and a similar portion of a section of flexible tubing 109 at the right. The coupling assembly is indicated as a whole at 110 and comprises, as in the preceding form, a rigid female member, or outer metal shell 111 having a pair of circumferential bulges B'B'. The member 111 also has inturned flanges 111a at its opposite ends. The inner surfaces of the member 111 are serrated or provided with teeth at 112. The inner or male coupling members are shown at 113, 114. Each of these flexible male coupling members or cuffs 113 is bonded to the end of its particular section of flexible tubing 108 or 109 and has a pair of end portions 114, the outer ones of the two pairs being in contact with the opposite end flanges 111a. The inner or male member 113 of the coupling assembly is split annularly to include an inner layer and an outer layer, or laminae 115.

The web portion 113 of each inner coupling member is provided with one or more pressure escape ports, or openings 120 communicating with the interior of the pipe ends 108 and 109, as shown. Thus, the fluid within the pipe line, including sections 108 and 109, passes through the ports or openings 120 and expands the outer layer or laminae 115 until it moves outwardly into intimate contact with the serrated surfaces 112, thus forming or providing a pair of expansion chambers C' within the bulges B' of the coupling assembly.

This quick-detachable coupling is assembled in a manner similar to that described in connection with the assembly of the preceding form. After the parts are assembled or coupled, as shown in FIG. 5, pressure admitted to the pipe lines and passing through pipe sections 108 and 109 and ports 120 will force the portions 115 outward to create chambers C' in the bulged areas B' of the outer coupling member 111. This, together with the ends 114 being in abutting relation to each of the flanges 111a, will lock the parts together against any possible leakage or unauthorized separation or disassembling of the coupling assembly 110. Moreover, the sealing coefficient becomes increasingly effective as the pressure of the fluid media in the pipe line 108, 109 increases, but does not in any way change the internal diameter of the pipe sections 108 and 109 in the area of the coupling means. It is to be noted particularly that the increase in pressure does not decrease the internal diameter. Because of this, it is possible, when desirable, to pass a so-called "pig" 121 through the coupling and its connected flexible tubular sections to clean the line and remove debris therefrom.

In FIG. 6 there is shown another modified form of quick-detachable coupling embodying the present invention. In this form, the coupling assembly, shown as a whole at 210, has been employed to connect together the adjacent end portions of lengths of flexible tubing 208 and 209. The coupling assembly is shown as being of tubular form, having its inner surface provided with a plurality of serrations or teeth 212 and having at its opposite outer ends, inturned flanges 211a. This coupling 210 of FIG. 6 is assembled with its pipe ends or sections 208 and 209 in the same manner as explained in connection with the two preceding forms of this invention. Here again, the pressure of the fluid media within the pipe line 208, 209 serves to expand the male coupling parts to interlock with the outer or female coupling member to hold them together against accidental displacement. As in the preceding forms, there are provided inner flexible expansible coupling members or male parts 213, one such being preferably bonded to the end portion of each of the flexible tubes 208 and 209. Pressure of the fluid media within the line will cause these cuff-like parts 213 to expand or move outwardly into intimate engagement with the serrations or teeth 212, of the outer shell 210. Any increase in pressure within the pipe line will likewise increase the pressure of the members 213 against the outer rigid member 211 of the coupling, thus increasing the locking action of the coupling parts. If it is desirable to clean the line, a so-called "pig" 221 may be employed for the purpose in a conventional manner.

The pipe line sections referred to above in connection with each of the forms of the present invention may be formed from rubber and fabric or from any suitable elastomer. By virtue of the fact that flexible piping or tubing is employed, the various sections thereof, whether coupled together or in individual lengths, can be flattened out and wrapped around a suitable reel for transportation purposes. The couplings 10, 110 and 210 of the present invention lend themselves to assembly in the field with ease and facility and are of a nature and structure which permits them to be assembled and disassembled at will without causing damage to either the parts of the couplings themselves, or to the flexible tubing or pipe sections with which they are used.

Whereas, it has been stated that the cuff-like flexible inner or male members 13, 113, and 213 of the several coupling assemblies are preferably bonded, or otherwise affixed to the ends of the flexible tubing sections, it is conceivable and entirely within the scope of the present invention to provide these members as members which are separate from the pipe or tubing sections with which they are intended to cooperate. By virtue of the fact that the various inner or male coupling members or parts are formed from flexible material, as are the sections of the pipe line, such members are capable of being flattened in a like manner with the pipe line sections to which they are attached, thus permitting packing, storing, or shipment with compactness and thus consequent conservation of space, a most important advantage especially when the invention is being used under combat conditions.

I claim:

1. A coupling assembly for connecting together the adjacent end portions of two flexible hose sections for fluid transmission purposes, said coupling assembly comprising a single-walled hollow rigid outer shell having a serrated inner surface adapted to span adjacent end portions of said hose sections, said rigid outer shell having portions thereof substantially cylindrical and of a diameter to receive said hose sections and having at least one radially outwardly extending annular bulged portion intermediate the ends thereof and disposed to be completely underlaid by one of said hose sections, at least one resilient tubular inner member having its end portion mounted on the end portion of one of the hose sections in fluid tight relation thereto, the outer diameter of the end portions of said inner member being such as to fit snugly within the inside diameter of those portions of the outer shell overlying and in contact with the end portion of said at least one inner member to provide an annular seal at said end portions, said tubular inner member being deformable radially outwardly into said bulged portion to interlock the same with the serrated inner surface of the rigid single-walled hollow outer shell and provide an annular expansion chamber within said coupling assembly, said tubular inner member having means providing intercommunication between said annular expansion chamber and the atmosphere, and means associated with the rigid outer shell to create a vacuum within the bulged portion to deform said resilient inner member outwardly into said bulged portion thereby maintaining said flexible hose sections and coupling assembly together as a unit against longitudinal separation.

2. A coupling assembly according to claim 1, wherein said last-named means is a valve assembly carried by said rigid outer shell.

References Cited in the file of this patent

UNITED STATES PATENTS

| | | |
|---|---|---|
| 1,590,580 | Hume | June 29, 1926 |
| 1,800,085 | Kroeger et al. | Apr. 7, 1931 |
| 2,537,716 | Parr | Sept. 26, 1950 |
| 2,749,150 | Kaiser | June 5, 1956 |
| 2,827,312 | Spencer | Mar. 18, 1958 |

FOREIGN PATENTS

| | | |
|---|---|---|
| 494,402 | Great Britain | Oct. 25, 1938 |
| 912,645 | Germany | May 31, 1954 |